(12) United States Patent
Liao et al.

(10) Patent No.: US 9,082,329 B2
(45) Date of Patent: Jul. 14, 2015

(54) DISPLAY PANEL AND 3D DISPLAY DEVICE (71) Applicants: Qiaosheng Liao, Guandong (CN);
Chia-chiang Hsiao, Guangdong (CN);
Chih-Wen Chen, Guangdong (CN)

(72) Inventors: Qiaosheng Liao, Guandong (CN);
Chia-chiang Hsiao, Guangdong (CN);
Chih-Wen Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/517,907

(22) Filed: Oct. 19, 2014

(65) Prior Publication Data
US 2015/0062109 A1  Mar. 5, 2015

Related U.S. Application Data (62) Division of application No. 13/519,344, filed on Jun. 27, 2012, now Pat. No. 8,928,650.

(51) Int. Cl.
*G06F 3/038* (2013.01)
*G09G 5/00* (2006.01)
*G09G 5/02* (2006.01)
*G02B 27/26* (2006.01)
*H04N 13/04* (2006.01)

(52) U.S. Cl.
CPC *G09G 5/00* (2013.01); *G02B 27/26* (2013.01); *G09G 5/02* (2013.01); *H04N 13/0434* (2013.01); *G09G 2300/0426* (2013.01); *G09G 2300/0452* (2013.01); *G09G 2320/028* (2013.01); *H04N 13/0422* (2013.01)

(58) Field of Classification Search
CPC .. G06F 3/038; G03G 5/02; G03G 2300/0426; G03G 5/00; G03G 3/36; G03G 2300/0452; G03G 2320/028
USPC .................................. 345/87–100, 204–215
See application file for complete search history.

(56) References Cited

U.S. PATENT DOCUMENTS

| | | | |
|---|---|---|---|
| 2008/0055297 A1* | 3/2008 | Park | 345/205 |
| 2009/0174829 A1* | 7/2009 | Shin et al. | 349/37 |
| 2013/0088672 A1* | 4/2013 | Shin et al. | 349/110 |
| 2013/0250217 A1* | 9/2013 | Ma | 349/106 |

* cited by examiner

*Primary Examiner* — Vijay Shankar
(74) *Attorney, Agent, or Firm* — Andrew C. Cheng (57) ABSTRACT

The present invention provides a display panel and a 3D display device. The display panel comprising: a first substrate comprising multiple data lines, multiple scan lines, and multiple pixel units, wherein the pixel unit comprising three sub-pixel units, and each of the sub-pixel units electrically connects to the same data line sequentially, and each of the sub-pixel units electrically connects to the corresponding scan line, and the scan line corresponding to at least one of the sub-pixel unit and the scan line corresponding to the first sub-pixel unit of the adjacent next pixel unit are disposed side by side; and a second substrate disposed correspondingly to the first substrate and comprising a first black matrix disposed correspondingly to the scan lines. In the present invention, the scan lines corresponding to the multiple sub-pixels are disposed side by side such that increasing the width of the first black matrix between adjacent pixel units and vertical viewing angle and do not reduce the aperture ratio.

9 Claims, 9 Drawing Sheets

DISPLAY PANEL AND 3D DISPLAY DEVICE

CROSS REFERENCE

This is a divisional application of prior co-pending application Ser. No. 13/519,344, submitted on 27 Jun. 2012, entitled "Display Panel and 3D Display Device", which is a national stage application of PCT/CN12/74708 submitted on 2012 Apr. 26, and which is based on and claims priority of Chinese Patent Application No. 201210118945.4 filed on 2012 Apr. 20, the entire contents of which are hereby incorporated by reference.

BACKGROUND OF THE INVENTION

1. Field of the Invention

The present invention relates to a three-dimensional (3D) display area. and, more particularly, to a display panel and a three-dimensional (3D) display device.

2. Description of Related Art

Figure 1:
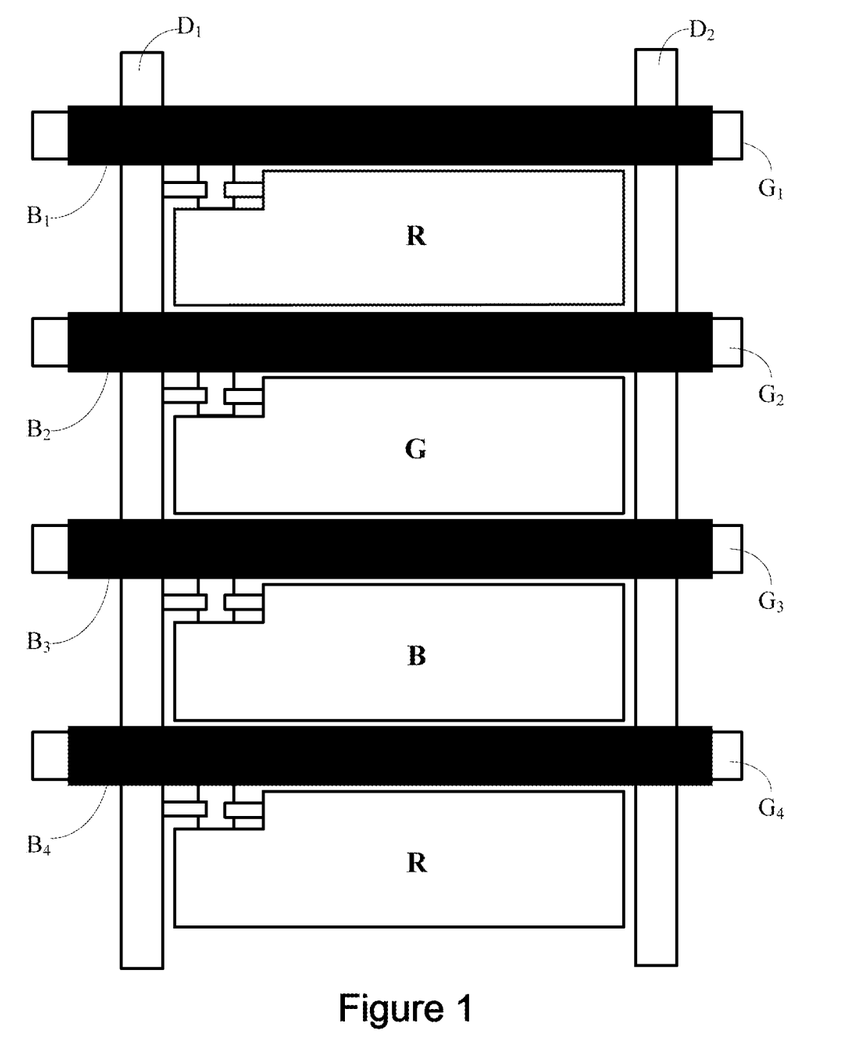
FIG. 1 is a schematic drawing of display panel with Tri-gate pixel structure in the prior art.

The current arrangement of pixels of the display panel includes a horizontal type and a vertical (the Tri-gate) type. In the horizontal type, sub-pixel units (RGB sub-pixel) are horizontally arranged. In the vertical type, the sub-pixel units are vertically arranged. FIG. 1 shows the schematic drawing of a display panel of the vertical type. The following uses one pixel structure as example for description. As shown in FIG. 1, the display device includes the relative disposition of the thin film transistor substrate and a color filter substrate. Multiple scan lines G1, G2, G3, and G4, and multiple data lines D1 and D2 are disposed on the thin-film transistor substrate, and the multiple scan lines G1, G2, G3, and G4 and the multiple data lines and D2 are cross to define RGB sub-pixel units. The color filter substrate is disposed above the thin film transistor substrate, and a black matrix (BM) layer B1, B2, B3, and B4 are dispersed on the color filter substrate. Each black matrix layer B1, B2, B3, and B4 is correspondingly disposed above the scan lines G1, G2, G3, and G4 for separate the color crosstalk of the sub-pixels.

Comparing to the horizontal type, the vertical type shown in FIG. 1 can reduce the numbers of the source drivers (Source ICs) which are more expensive component of the display panel, savings cost. Therefore, the display panels with the vertical type are more popular in 3D display device application.

Figure 2:
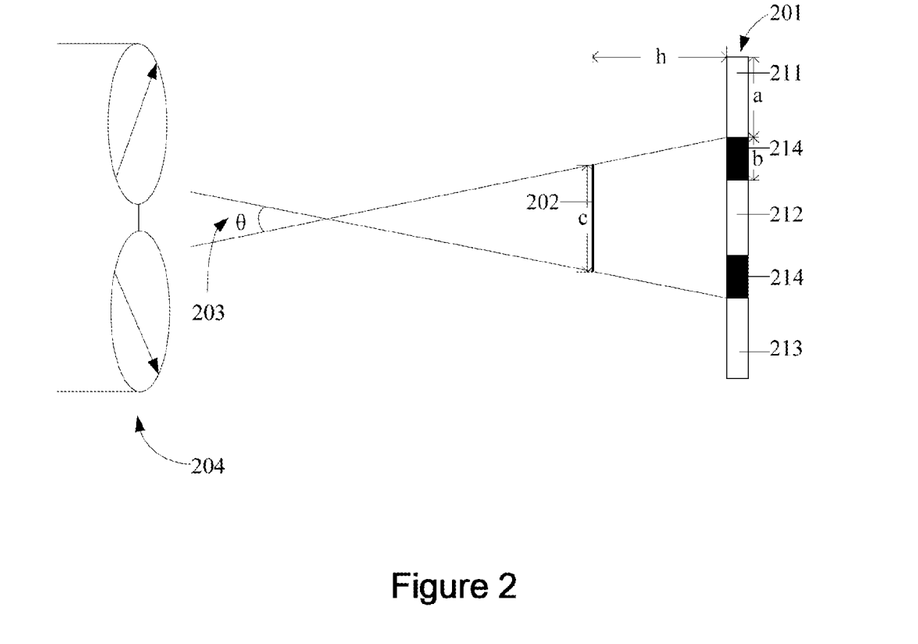
FIG. 2 is a schematic drawing of the three-dimensional display in the prior art.

The three-dimensional display method of today's mainstream is using a polarized glasses with phase difference plate technology. FIG. 2 is a schematic diagram of the basic operating principle in existing technology. The operating principle is attaching a phase difference plate 202 on the light emitting direction of the display panel 201 and using phase delay of different regions on the phase difference plate 202 such that lights of different pixels emit by different polarization directions. Therefore, the viewer wearing a polarized glasses 204 can observe a 3D image.

However, due to the image crosstalk between the signals of left and right eye, the 3D display technology using phase difference plate exist the drawback of smaller vertical viewing angle.

Specifically, as shown in FIG. 2, the distance between the panel 201 and the phase difference plate 202 is h. The following uses three pixels in the display area of the display panel 201 for example. The black matrix 214 area is between odd-row pixels 211, 213 and even-row pixel 212. Letter a is the height of the pixel display area and letter h is the width of the black matrix 214 in the vertical direction, and letter c is the height of the phase delay fringes of the phase plate 202, wherein, p=a+b, and p is a fixed value for the pixel size. The non-cross-talk display area 203 in the figure is the vertical viewing angle θ and satisfies the following relationship:

$$\tan\frac{\theta}{2} = \frac{2p + b - 2c}{2h} \qquad \text{relationship formula 1}$$

From the relationship formula 1, increasing the width b of the black matrix can increase the vertical viewing angle θ, but will reduce the height of a pixel display area. a, thereby reducing the aperture ratio of the display panel.

In summary, it is necessary to provide a display panel and a 3D display device for solving the problem of existing technology that is increasing the width of the shading layer (BM) to increase the vertical viewing angle, but reducing the aperture ratio.

SUMMARY OF THE INVENTION

The main technical problems solving by the present invention is to provide a display panel and a 3D display device, in order to solve the problems with increasing the width of the shading layer (BM) to increase the vertical viewing angle, but also reducing the aperture ratio in the prior art.

In order to solve these technical problems, technical solution used in this invention is: to provide a display panel comprising:

a first substrate comprising multiple data lines disposed parallel and alternately, multiple scan lines disposed perpendicular to the direction of the data lines, and multiple pixel units disposed as a matrix, wherein the pixel units comprising a first sub-pixel unit, a second sub-pixel unit, and a third sub-pixel, wherein the sub-pixel units electrically connects to the same data line sequentially, and each of the sub-pixel units electrically connects to the corresponding scan line, and the scan line corresponding to the second sub-pixel unit, the scan line corresponding to the third sub-pixel unit, and the scan line corresponding to the first sub-pixel unit of the next pixel unit are disposed side by side; and a second substrate disposed correspondingly to the first substrate and comprising a first black matrix disposed correspondingly to the scan lines of the first substrate and a second black matrix disposed correspondingly above the boundary region between the first sub-pixel and the second sub-pixel unit, wherein the width of the first black matrix is greater than the width of the scan line, and the width of the second black matrix is less than the width of the first black matrix.

Wherein, the three scan lines are disposed side by side by jump line method.

Another technical solution used to solve these technical problems, the present invention is: to provide a display panel, the display panel include: a first substrate comprising multiple data lines disposed parallel and alternately, multiple scan lines disposed perpendicular to the direction of the data lines, and multiple pixel units disposed as a matrix, wherein the pixel units comprising three sub-pixel units, and each of the sub-pixel units electrically connects to the same data line sequentially, and each of the sub-pixel units electrically connects to the corresponding scan line, and the scan line corresponding to at least one of the sub-pixel unit and the scan line corresponding to the first sub-pixel unit of the adjacent next pixel unit are disposed side by side; and a second substrate disposed correspondingly to the first substrate and comprising a first black matrix disposed correspondingly to the scan lines.

Wherein, the display panel further comprising:
a gate driver connected to the scan lines for providing a scanning voltage to the multiple sub-pixel units; and
a source driver connected to the data lines for providing a driving voltage to the multiple sub-pixel units.

Wherein, the sub-pixel unit comprising a pixel electrode and a thin film transistor for driving the sub-pixel, wherein the gate, the source, and the drain of the thin film transistor are electrical connected to the scan line, the data line, and the pixel electrode respectively.

Wherein, the pixel unit comprising a first sub-pixel, a second sub-pixel unit and a third sub-pixel unit disposed sequentially along the direction of the data lines, wherein the scan line corresponding to the third sub-pixel closest to the next pixel unit and the scan line corresponding to the first sub-pixel unit of the next pixel unit are disposed side by side.

Wherein, the second substrate further comprising a second black matrix, wherein the second black matrix is disposed correspondingly above the boundary region between the second sub-pixel unit and the third sub-pixel unit, and the width of the second black matrix is less than the width of the first black matrix.

Wherein, the scan line corresponding to the second sub-pixel unit, the scan line corresponding to the third sub-pixel unit, and the scan line corresponding to the first sub-pixel of the next pixel are disposed side by side.

Wherein, the second black matrix is disposed correspondingly above the boundary region between the second sub-pixel unit and the third sub-pixel unit.

Wherein, the three scan lines realize side-by-side disposition by jump line method.

Wherein, the width of the first black matrix is greater than the width of the scan line.

Another technical solution used to solve these technical problems is: providing a 3D display device, the 3D display device comprising: a display panel; and
a phase difference plate disposed at the light emitting direction of the display panel and disposed parallel and alternately with the display panel.

Wherein, the display comprising:
a first substrate comprising multiple data lines disposed parallel and alternately, multiple scan lines disposed perpendicular to the direction of the data lines, and multiple pixel units disposed as a matrix.

Wherein, the pixel units comprising three sub-pixel units, and each of the sub-pixel units electrically connects to the same data line in order, and each of the sub-pixel units electrically connects to the corresponding scan line, and the scan line corresponding to at least one of the sub-pixel unit and the scan line corresponding to the first sub-pixel unit of the adjacent next pixel unit are disposed side by side; and
a second substrate disposed correspondingly to the first substrate and comprising a first black matrix disposed correspondingly to the scan lines.

Wherein, the display panel further comprising:
a gate driver connected to the scan lines for providing a scanning voltage to the multiple sub-pixel units; and
a source driver connected to the data lines for providing a driving voltage to the multiple sub-pixel units.

Wherein, the sub-pixel unit comprising a pixel electrode and a thin film transistor for driving the sub-pixel, wherein the gate, the source, and the drain of the thin film transistor are electrical connected to the scan line, the data line and the pixel electrode respectively.

Wherein, the pixel unit comprising a first sub-pixel, a second sub-pixel unit and a third sub-pixel unit disposed sequentially along the direction of the data line, wherein the scan line corresponding to the third sub-pixel closest to the next pixel unit and the scan line corresponding to the first sub-pixel unit of the next pixel unit are disposed side by side.

Wherein, the second substrate further comprising a second black matrix, wherein the second black matrix is disposed correspondingly above the boundary region between the second sub-pixel unit and the third sub-pixel unit, and the width of the second black matrix is less than the width of the first black matrix.

Wherein, the scan line corresponding to the second sub-pixel unit, the scan line corresponding to the third sub-pixel unit, and the scan line corresponding to the first sub-pixel unit of the next pixel are disposed side by side.

Wherein, the second black matrix is disposed correspondingly above the boundary region between the second sub-pixel unit and the third sub-pixel unit.

Wherein, the three scan lines realize side-by-side disposition by jump line method.

Wherein, the width of the first black matrix is greater than the width of the scan line.

The beneficial effects of the present invention are: In the present invention, the scan lines corresponding to multiple sub-pixels are disposed side by side such that increasing the width of the first black matrix between adjacent pixel units and vertical viewing angle and do not reduce the aperture ratio.

DETAILED DESCRIPTION OF THE PREFERRED EMBODIMENT

The following combines drawings and embodiments for detailed description of the present invention.

Figure 3:
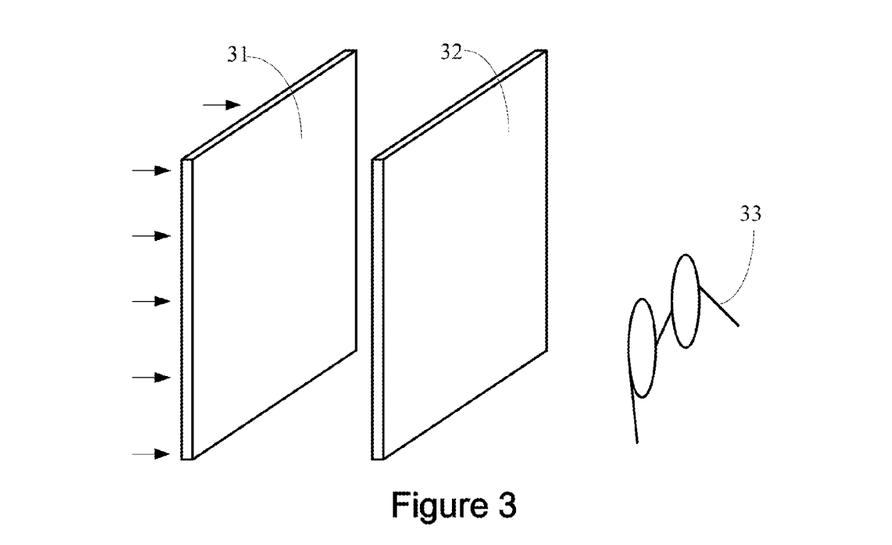
FIG. 3 is a schematic drawing of 3D display device structure of the present invention.

FIG. 3 is a schematic drawing of 3D display device structure of the present invention. As shown in FIG. 3, the 3D display device includes a display panel 31 and the phase difference plate 32.

In the present invention, the phase difference plate 32 is disposed at the side of light emitting direction of the display panel 31 and disposed parallel and alternately with the display panel 31. It should be noted that the 3D device is suitable for the observer wearing a glasses 33 with two polarization direction orthogonal lens.

Figure 4:
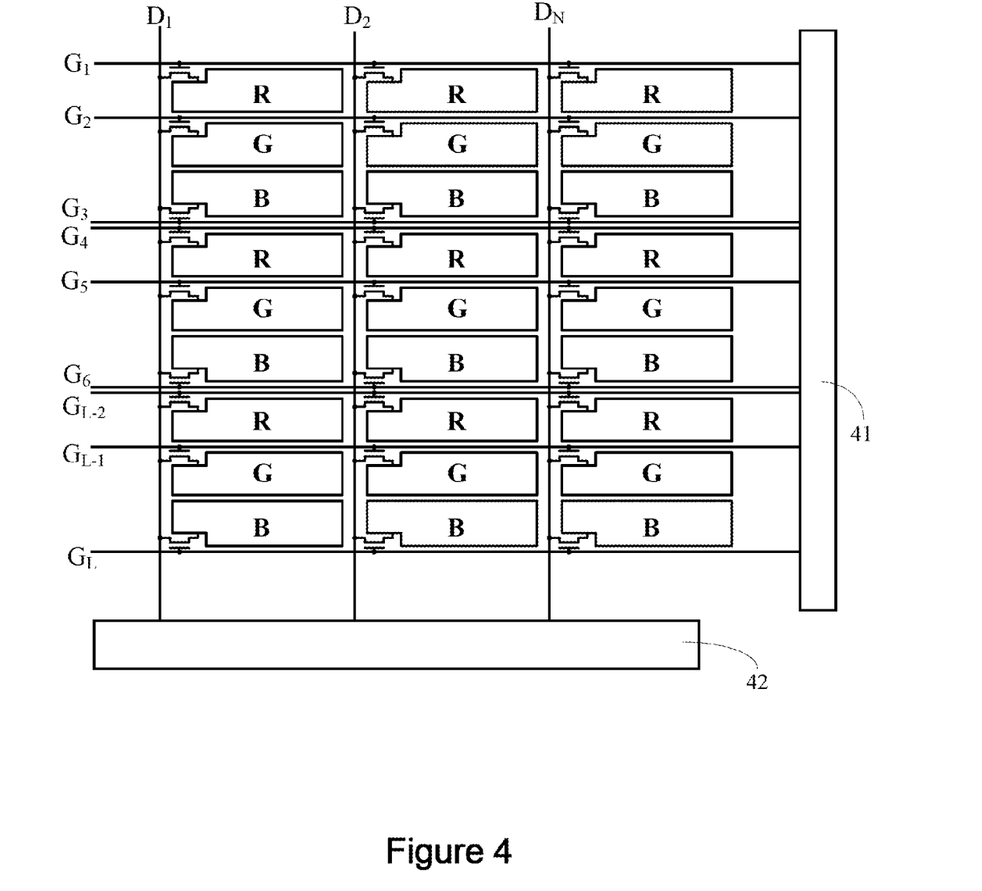
FIG. 4 is a schematic drawing of the display panel structure of the first embodiment of the present invention.

Wherein, the display panel 31 is preferably having a vertical pixel structure. FIG. 4 is a schematic drawing of the display panel having tri-gate pixel structure of the first embodiment of the present invention.

As shown in FIG. 4, the display panel 31 includes multiple RGB pixel units distributed as a matrix, and multiple data lines D1, D2, . . . , and DN disposed parallel and alternately, and multiple scan lines G1, G2, . . . , and GL disposed perpendicular to the direction of the data lines.

Wherein, each RGB pixel unit includes three R, G, B sub-pixel units sequentially electrically connected with the same data line. Multiple scan lines, G1, G2, . . . , and GL connected to a gate driver 41. Multiple data lines, D1, D2, . . . , and DN, connected to a source driver 42. The gate driver 41 provides a scanning voltage to multiple R, G, B sub-pixel units, and the source driver 42 provides a driving voltage to the multiple R, and B sub-pixel units.

In the present invention, the display panel including a first substrate and a second substrate relative disposed. Because each RGB pixel unit of the display panel is similar, the following description uses one RGB pixel unit for example.

Figure 5:
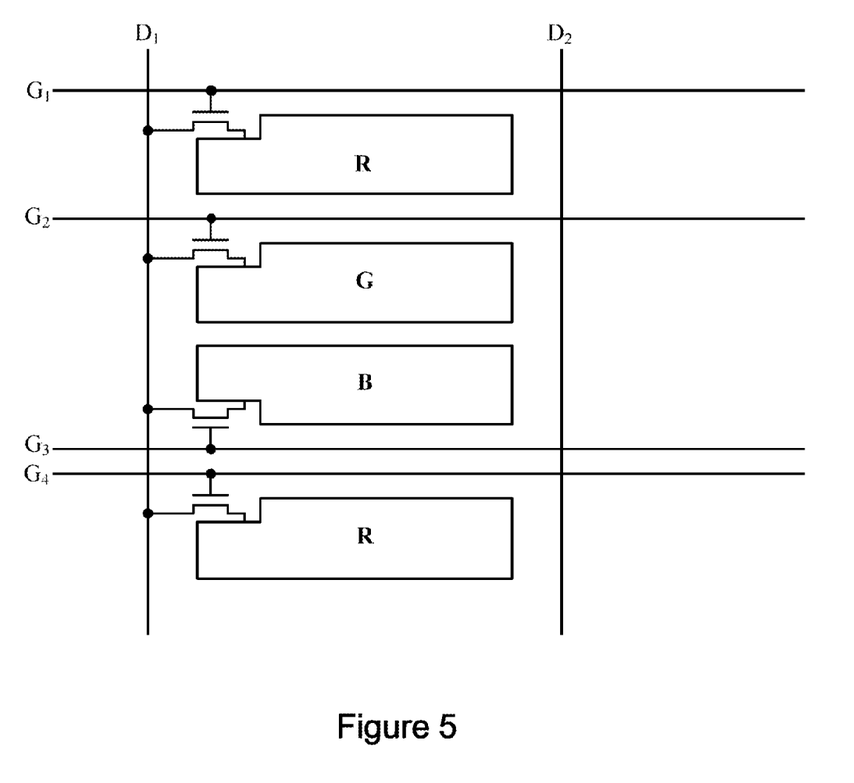
FIG. 5 is a part enlargement schematic drawing of the panel in FIG. 4.
Figure 6:
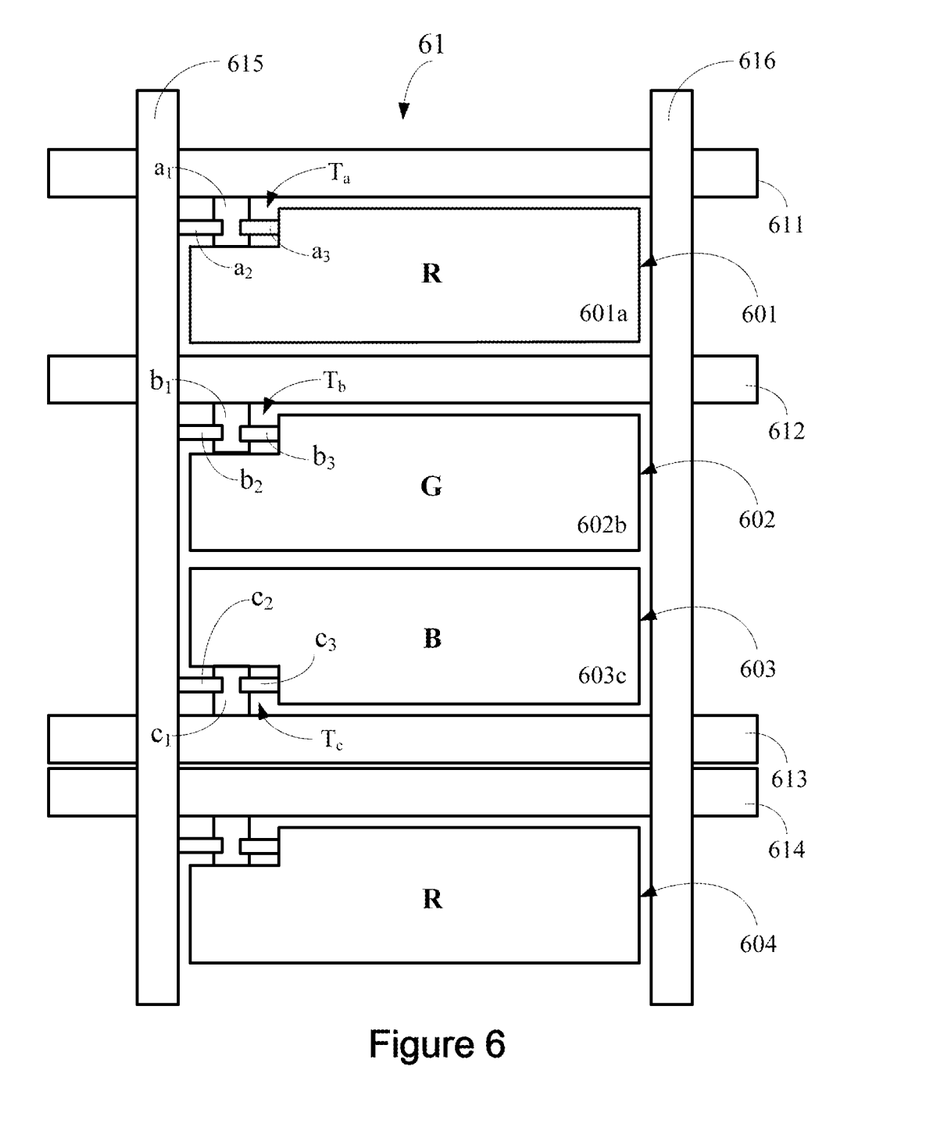
FIG. 6 is a schematic drawing of the first substrate of display panel in FIG. 5.

FIG. 5 is a part enlargement schematic drawing of the display panel in FIG. 4 and FIG. 6 is a schematic drawing of the first substrate of display panel in FIG. 5.

Specifically, as shown in FIG. 5 and FIG. 6, each RGB pixel unit 61 on the first substrate includes: a data line 615; three scan lines, 611, 612, and 613; and a first sub-pixel unit 601, a second sub-pixel unit 602, and a third pixel unit 603.

In this embodiment, the data line 615 and a data line 616 are disposed parallel and alternatively, and the scan lines, 611, 612, and 613 are disposed sequentially perpendicular to the data lines 615.

The first sub-pixel unit 601, the second sub-pixel unit 602, and the third pixel unit 603 sequentially electrically connected to the same data line 615 to control the display of red, green, and blue, respectively.

Wherein, each of the sub-pixel units electrically connects to the corresponding scan line, that is:

The first sub-pixel unit 601 electrically connects to the scan line 611, and the second sub-pixel unit 602 electrically connects to scan line 612, and the third sub-pixel unit 603 electrically connects to the scan line 613. The scan line 613 which is corresponding to the third sub-pixel unit 603 closest to the next pixel unit and the scan line 614 which is corresponding to the first sub-pixel unit 604 of the next pixel unit are disposed parallel and alternatively.

In this embodiment, each sub-pixel unit includes a pixel electrode and a thin film transistor, that is:

The first sub-pixel unit 601 includes a pixel electrode 601a and a thin-film transistor Ta; second sub-pixel unit 602 includes a pixel electrode 602b and a thin film transistor Tb; the third sub-pixel unit 603 includes a pixel electrode 603c and a thin film transistor Tc Wherein, the gate a1 of the thin film transistor Ta is electrical connected to the scan line 611; the source a2 is electrical connected data lines 615; the drain a3 is electrical connected to the pixel electrode 601a.

The gate b1 of thin-film transistor Tb is electrically connected to the scan line 612; the source b2 is electrically connected to the data lines 615; the drain b3 is electrically connected to the pixel electrode 602b.

The gate c1 of thin-film transistor Tc is electrically connected to the scan line 613; the source c2 is electrically connected to the data lines 615; the drain c3 is electrically connected to the pixel electrode 603e.

It should be noted that the thin-film transistors, Ta, Tb, and Tc, are used to drive the pixel electrodes, 601a, 602b, and 603c.

Figure 7:
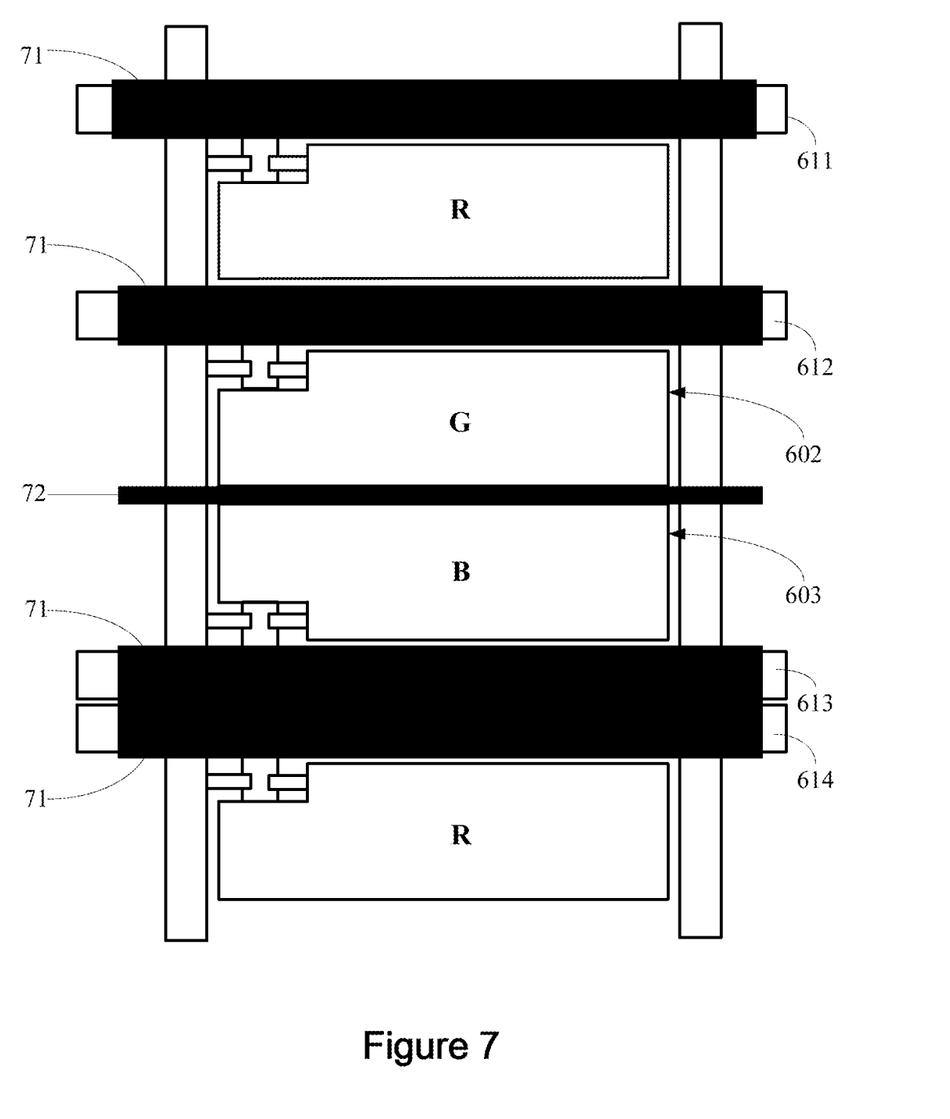
FIG. 7 is a schematic drawing of BM layer on the second substrate of the display panel shown in FIG. 5.

FIG. 7 is a schematic drawing of BM layer on the second substrate of the display panel shown in FIG. 5. As shown in FIG. 7, the second substrate includes a first black matrix 71 and a second black matrix 72.

In this embodiment, the first black matrix 71 is disposed correspondingly above the scan lines 611, 612, and 613, and the width of the first black matrix 71 is greater than the width of the scan lines 611, 612, and 613. The second black matrix 72 is disposed correspondingly above the boundary region between the second sub-pixel unit 602 and the third sub-pixel unit 603. It should be noted that the width of the second black matrix 72 is less than the width of the first black matrix 71.

In this embodiment, comparing the first black matrix 71 between two adjacent pixel units on the second substrate and the black matrix in the prior art shown in FIG. 1, the width of the first black matrix 71 is increased to double. Combining the schematic drawing of the three-dimensional display in the prior art shown in FIG. 2, the width b of the first black matrix 71 is increased to double in this embodiment; thus, in combination of the aforementioned relationship formula 1, the display panel of the present invention can increase the vertical view angle θ of the 3D display device.

Furthermore, comparing the multiple sub-pixel units and pixel units in this embodiment to the prior art shown in FIG. 1, the value of height a of the pixel display area does not change, that is: under the premise of improving the vertical view angle θ does not reduce the aperture ratio of the display panel.

Figure 8:
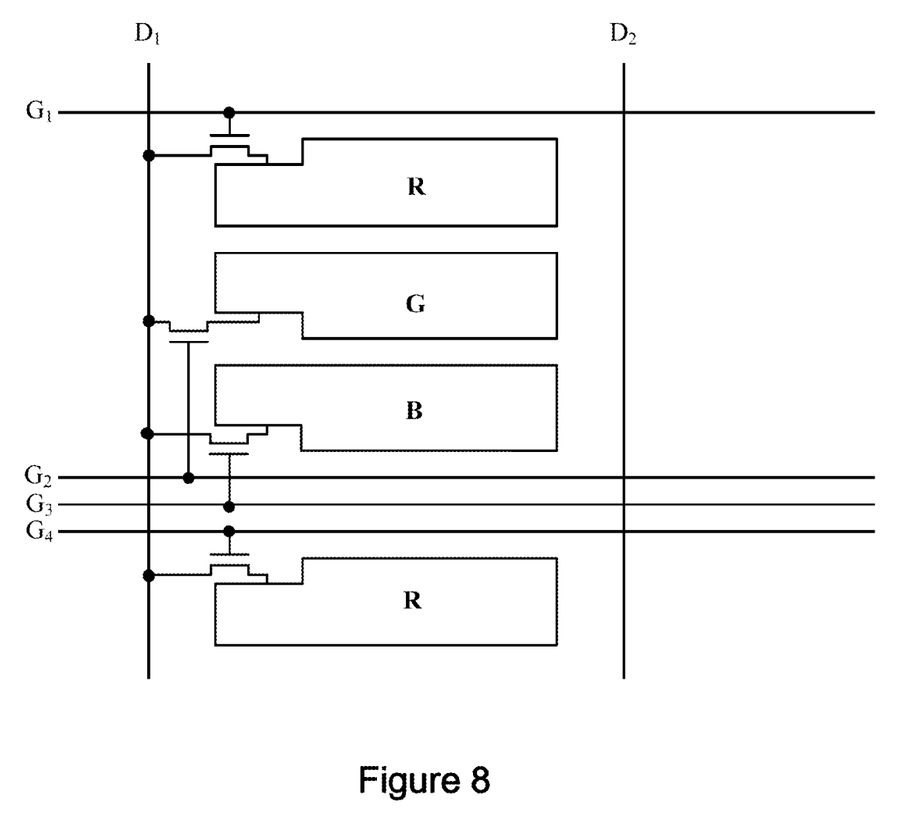
FIG. 8 is a schematic drawing or the display panel structure of the second embodiment of the present invention.

FIG. 8 is a schematic drawing of the display panel of the second embodiment of the present invention. In this embodiment, on the basis of the embodiment shown in FIG. 5, three scan lines are disposed side by side such that the width the black matrix between the adjacent pixel units on the color filter substrate increased by approximately double. Therefore, the display panel of the 3D display device using the display panel further increases the vertical view angle θ.

Figure 9:
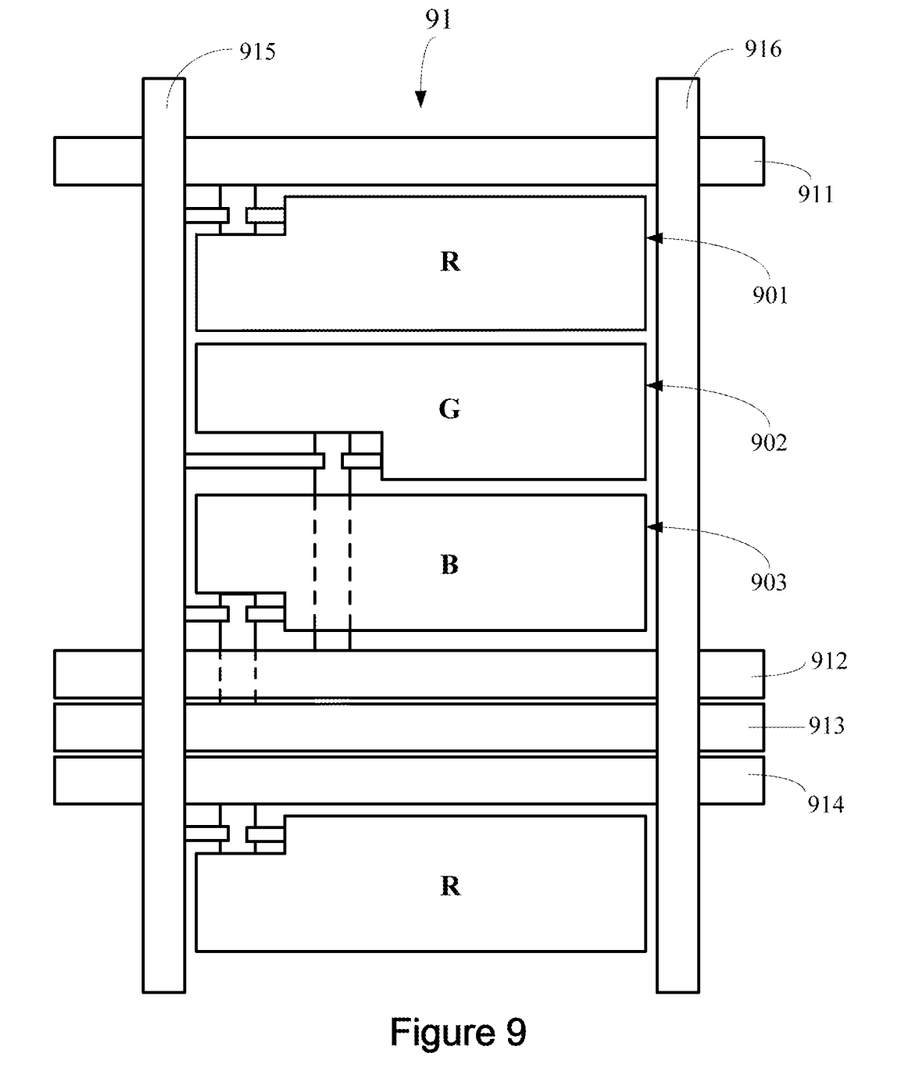
FIG. 9 is a schematic drawing of the first substrate of display panel in FIG. 8.

Specifically, as shown in FIG. 9. FIG. 9 is a schematic drawing of the first substrate of display panel in FIG. 8. In the way of implementation, a RGB pixel unit on the first substrate of the display panel 91 is used for an example. As shown in FIG. 9, a RGB pixel unit 91 on the first substrate includes: a data line 915; multiple scan lines, 911, 912, and 913; and a first sub-pixel unit 901, a second sub-pixel unit 902, and a third pixel unit 903.

In this embodiment, the data lines 915 and a data line 916 are disposed parallel and alternatively, and the scan lines, 911, 912, and 913 are disposed along the direction perpendicular to the data line 915.

The first sub-pixel unit 901, the second sub-pixel unit 902, and the third pixel unit 903 are sequentially electrically connected to the same data line 915 for controlling the display of red, green, and blue.

Wherein, each sub-pixel unit is electrically connected to a corresponding scan line, that is:

The first sub-pixel unit 901 is electrically connected to the scan lines 911, and the second sub-pixel unit 902 is electrically connected to the scan line 912, and the third sub-pixel unit 903 is electrically connected to the scan line 913. And the scan line 912 corresponding to the second sub-pixel unit 902 and the scan line 913 corresponding to the third sub-pixel unit 903 and the scan line 914 corresponding to a first sub-pixel unit 904 of next pixel unit are disposed side by side, wherein, the scan line 912, the scan line 913, and the scan line 914 realize side-by-side disposition by jump line method.

In this embodiment, the first sub-pixel unit 901, the second sub-pixel unit 902, and the third pixel unit 903 respectively include a pixel electrode and a thin film transistor. The operation principle and connection method of each pixel electrode and thin film transistor connected are the same with the embodiment shown in FIG. 5, no more repeating.

Figure 10:
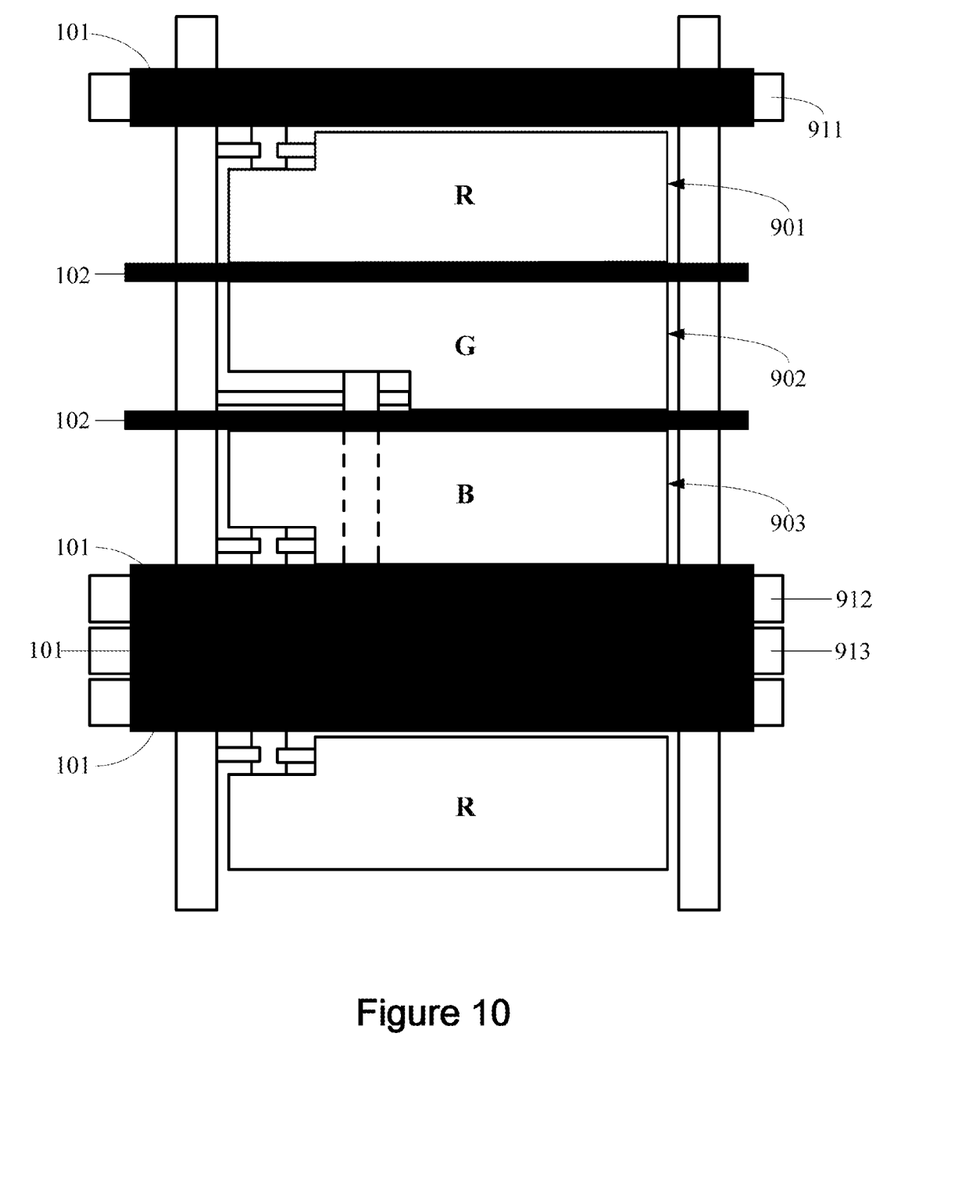
FIG. 10 is a schematic drawing of BM layer on the second substrate of the display panel shown in FIG. 8.

FIG. 10 is a schematic drawing of BM layer on the second substrate of the display panel shown in FIG. 8. As shown in FIG. 10, the second substrate includes a first black matrix 101 and a second black matrix 102.

In this embodiment, the first black matrix 101 is disposed correspondingly above the scan lines, 911, 912, and 913. And the widths of the first black matrix 104 are greater than the widths of the scan lines 911, 912, and 913. The second black matrix 102 is disposed correspondingly above the boundary region between the first sub-pixel unit 901 and the second sub-pixel unit 902 and above the second sub-pixel unit 902 and the third sub-pixel unit 903. It should be noted that the widths of the second black matrix 102 are less than the widths of the first black matrix 101.

As described above, the difference between this embodiment and the embodiment shown in FIG. 5 is that the scan line 912 corresponding to the second sub-pixel unit 902 and the scan line 913 corresponding to the third sub-pixel unit 903 and the scan line 914 corresponding, to the sub-pixel unit 904 of the next pixel unit are disposed side by side.

Because the first black matrix 101 is disposed correspondingly above the scan line, in this embodiment, the width of the first black matrix 101 between two adjacent pixel units on the second substrate (color filter substrate) increase by approximately double with comparing to the prior art shown in FIG. 1. Combining the 3D display principle of the prior art shown in FIG. 2, the width b of the first black matrix 101 increases approximately double in this embodiment. By combining the aforementioned relationship formula 1, the display panel of the present invention can make the vertical viewing angle θ of the 3D device becomes larger.

Furthermore, this embodiment, the value of the height a of the display area of the sub-pixel unit does not change. Therefore, when increase the vertical viewing angle θ, it does not sacrifice the aperture ratio of the display panel or impact aperture ratio of the display panel.

In summary, in the present invention, the scan lines corresponding to multiple sub-pixels are disposed side by side such that increasing the width of the first black matrix between adjacent pixel units and vertical viewing angle and do not reduce the aperture ratio.

The above embodiments of the present invention are not used to limit the claims of this invention. Any use of the content in the specification or in the figures of the present invention which produces the equivalent structures or an equivalent process, or directly or indirectly used in other related technical fields is still covered by the chums in the present invention.

What is claimed is:

1. A three dimensional display device comprising:
a display panel; and
a phase difference plate disposed at the light emitting direction of the display panel and disposed parallel and alternately with the display panel;
wherein, the display comprising:
a first substrate comprising multiple data lines disposed parallel and alternately, multiple scan lines disposed perpendicular to the direction of the data lines, and multiple pixel units disposed as a matrix;
wherein the pixel units comprising three sub-pixel units, and each of the sub-pixel units electrically connects to the same data line in order, and each of the sub-pixel units electrically connects to the corresponding scan line, and the scan line corresponding to at least one of the sub-pixel unit and the scan line corresponding to the first sub-pixel unit of the adjacent next pixel unit are disposed side by side; and
a second substrate disposed correspondingly to the first substrate and comprising a first black matrix disposed correspondingly to the scan lines.

2. The three dimensional device according to claim 1, wherein, the display panel further comprising:
a gate driver connected to the scan lines for providing a scanning voltage to the multiple sub-pixel units; and
a source driver connected to the data lines for providing a driving voltage to the multiple sub-pixel units.

3. The three dimensional device according to claim 1, wherein, the sub-pixel unit comprising a pixel electrode and a thin film transistor for driving the sub-pixel, wherein the gate, the source, and the drain of the thin film transistor are electrical connected to the scan line, the data line and the pixel electrode respectively.

4. The three dimensional display device according to claim 1, wherein, the pixel unit comprising a first sub-pixel, a second sub-pixel unit and a third sub-pixel unit disposed sequentially along the direction of the data line, wherein the scan line corresponding to the third sub-pixel closest to the next pixel unit and the scan line corresponding to the first sub-pixel unit of the next pixel unit are disposed side by side.

5. The three dimensional display device according to claim 4, wherein, the second substrate further comprising a second black matrix, wherein the second black matrix is disposed correspondingly above the boundary region between the second sub-pixel unit and the third sub-pixel unit, and the width of the second black matrix is less than the width of the first black matrix.

6. The three dimensional display device according to claim 5, wherein, the scan line corresponding to the second sub-pixel unit, the scan line corresponding to the third sub-pixel unit, and the scan line corresponding to the first sub-pixel unit of the next pixel are disposed side by side.

7. The three dimensional display device according to claim 6, wherein, the second black matrix is disposed correspondingly above the boundary region between the second sub-pixel unit and the third sub-pixel unit.

8. The three dimensional display device according to claim 6, wherein, the three scan lines realize side-by-side disposition by jump line method.

9. The three dimensional display device according to claim 1, wherein, the widths of the first black matrix are greater than the widths of the scan lines.

* * * * *